United States Patent
Tsirkin

(10) Patent No.: US 12,498,954 B2
(45) Date of Patent: Dec. 16, 2025

(54) SECURE VIRTUAL MACHINE AND PERIPHERAL DEVICE COMMUNICATION

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 127 days.

(21) Appl. No.: 18/183,074

(22) Filed: Mar. 13, 2023

(65) Prior Publication Data

US 2023/0221985 A1 Jul. 13, 2023

Related U.S. Application Data

(62) Division of application No. 16/824,538, filed on Mar. 19, 2020, now Pat. No. 11,604,671.

(51) Int. Cl.
| | |
|---|---|
| *G06F 9/54* | (2006.01) |
| *G06F 9/455* | (2018.01) |
| *G06F 13/28* | (2006.01) |
| *G06F 13/32* | (2006.01) |
| *H04L 9/08* | (2006.01) |
| *H04L 9/32* | (2006.01) |

(52) U.S. Cl.
CPC .......... *G06F 9/45558* (2013.01); *G06F 9/544* (2013.01); *G06F 13/28* (2013.01); *G06F 13/32* (2013.01); *H04L 9/0825* (2013.01); *H04L 9/0894* (2013.01); *H04L 9/3247* (2013.01); *G06F 2009/45583* (2013.01); *G06F 2009/45587* (2013.01); *G06F 2009/45595* (2013.01)

(58) Field of Classification Search
CPC .............. G06F 9/45558; G06F 9/544; G06F 2009/45595; G06F 2009/45587; G06F 2009/45579; H04L 9/0825; H04L 9/3247
See application file for complete search history.

(56) References Cited

U.S. PATENT DOCUMENTS

| | | |
|---|---|---|
| 5,610,715 A | 3/1997 | Yoshii et al. |
| 6,377,060 B1 | 4/2002 | Burkhart et al. |
| 8,023,528 B2 | 9/2011 | Hendel et al. |

(Continued)

FOREIGN PATENT DOCUMENTS

CN 109858265 A 6/2019

OTHER PUBLICATIONS

Avid Kaplan et al., AMD Memory Encryption, https://developer.amd.com/wordpress/media/2013/12/AMD_Memory_Encryption_Whitepaper_v7-Public.pdf, Apr. 21, 2016, Advanced Micro Devices.

(Continued)

*Primary Examiner* — Dao Q Ho
(74) *Attorney, Agent, or Firm* — Dority & Manning, P.A.

(57) ABSTRACT

A method includes exposing a public cryptographic key associated with a peripheral device of a computing system to a guest running on the computing system. The method further includes receiving, from the guest, a message including a cryptographic nonce value encrypted with the public cryptographic key. The method further includes producing the cryptographic nonce value by decrypting the message using a private cryptographic key associated with the public cryptographic key. The method further includes using a shared cryptographic key generated from the cryptographic nonce value to access contents of a direct memory access (DMA) buffer associated with the peripheral device.

20 Claims, 7 Drawing Sheets

(56) References Cited

U.S. PATENT DOCUMENTS

| | | | |
|---|---|---|---|
| 8,954,897 | B2 | 2/2015 | Neystadt et al. |
| 9,477,486 | B2 | 10/2016 | Raj et al. |
| 9,672,052 | B1 | 6/2017 | Berreth et al. |
| 9,678,895 | B2 | 6/2017 | Scott-Nash |
| 9,906,493 | B1* | 2/2018 | Rodgers ................ H04L 63/061 |
| 10,048,982 | B2 | 8/2018 | Chen et al. |
| 10,089,124 | B2 | 10/2018 | Barlev et al. |
| 10,176,122 | B2 | 1/2019 | Kaplan et al. |
| 10,303,899 | B2 | 5/2019 | Durham et al. |
| 2008/0066074 | A1* | 3/2008 | Nutter ..................... G06F 21/71 718/107 |
| 2015/0286582 | A1* | 10/2015 | Scott-Nash ......... G06F 9/44505 726/2 |
| 2015/0378641 | A1* | 12/2015 | Franke ................. G06F 3/0605 710/74 |
| 2016/0239339 | A1 | 8/2016 | Chen et al. |
| 2016/0253276 | A1* | 9/2016 | Jeong ................... G06F 13/105 710/33 |
| 2018/0107608 | A1* | 4/2018 | Kaplan ............... G06F 12/1466 |
| 2018/0239715 | A1* | 8/2018 | Tsirkin ................... G06F 13/28 |
| 2018/0247082 | A1* | 8/2018 | Durham ................. G06F 21/53 |
| 2019/0286577 | A1* | 9/2019 | Leitao ..................... G06F 9/544 |
| 2020/0151362 | A1 | 5/2020 | Harriman et al. |
| 2020/0310972 | A1* | 10/2020 | Shanbhogue ......... G06F 9/4403 |
| 2021/0294628 | A1 | 9/2021 | Tsirkin |
| 2021/0389965 | A1 | 12/2021 | Dabak et al. |

OTHER PUBLICATIONS

Mengyuan Li et al., Exploiting Unprotected I/O Operations in AMD's Secure Encrypted Virtualization, https://www.usenix.org/system/files/sec19-li-mengyuan_0.pdf, Aug. 14-16, 2019, The Ohio State University; University of Central Florida.

Shih-Wei Li, John S. Koh, and Jason Nieh, "Protecting Cloud Virtual Machines from Hypervisor and Host Operating System Exploits", https://www.usenix.org/system/files/sec19-li-shih-wei.pdf, Department of Computer Science, Columbia University, Aug. 14-16, 2019, 19 pages.

ZeCoRx—Zero Copy Receive, 1. htttps://www.mikelangelo-project.eu/technology/zecorx-zero-copy-receive/, downloaded Nov. 27, 2019.

* cited by examiner

SECURE VIRTUAL MACHINE AND PERIPHERAL DEVICE COMMUNICATION

RELATED APPLICATIONS

This application is a divisional application of co-pending U.S. patent application Ser. No. 16/824,538, filed Mar. 19, 2020, which is herein incorporated by reference.

TECHNICAL FIELD

Embodiments of the present disclosure relate to virtualization systems, and more specifically, relate to secure communication in virtualized computer systems.

BACKGROUND

A virtual machine (VM) is a portion of software that, when executed on hardware of a host computer system, creates an environment allowing for an abstraction of some physical components of the host computer system in order to allow running of various modules, for example, multiple operating systems, concurrently and in isolation from other modules. Virtualization permits, for example, consolidating multiple physical servers into one physical server running multiple VMs in order to enhance the hardware utilization rate. The host allocates a certain amount of its resources to each VM. Each VM can then use the allocated resources to execute applications, including operating systems (guest operating systems (OS)). A software layer providing the virtualization may be referred to as a hypervisor, a virtual machine monitor (VMM), or a kernel-based hypervisor, to name a few examples. The hypervisor emulates the underlying hardware of the host computer system, making the use of the VM transparent to the guest OS and the user of the VM. A VM may have a virtual processor, virtual system memory, virtual storage, and various virtual devices.

BRIEF DESCRIPTION OF THE DRAWINGS

The disclosure is illustrated by way of example, and not by way of limitation, and may be more fully understood with references to the following detailed description when considered in connection with the figures, in which.

DETAILED DESCRIPTION

Figure 1:
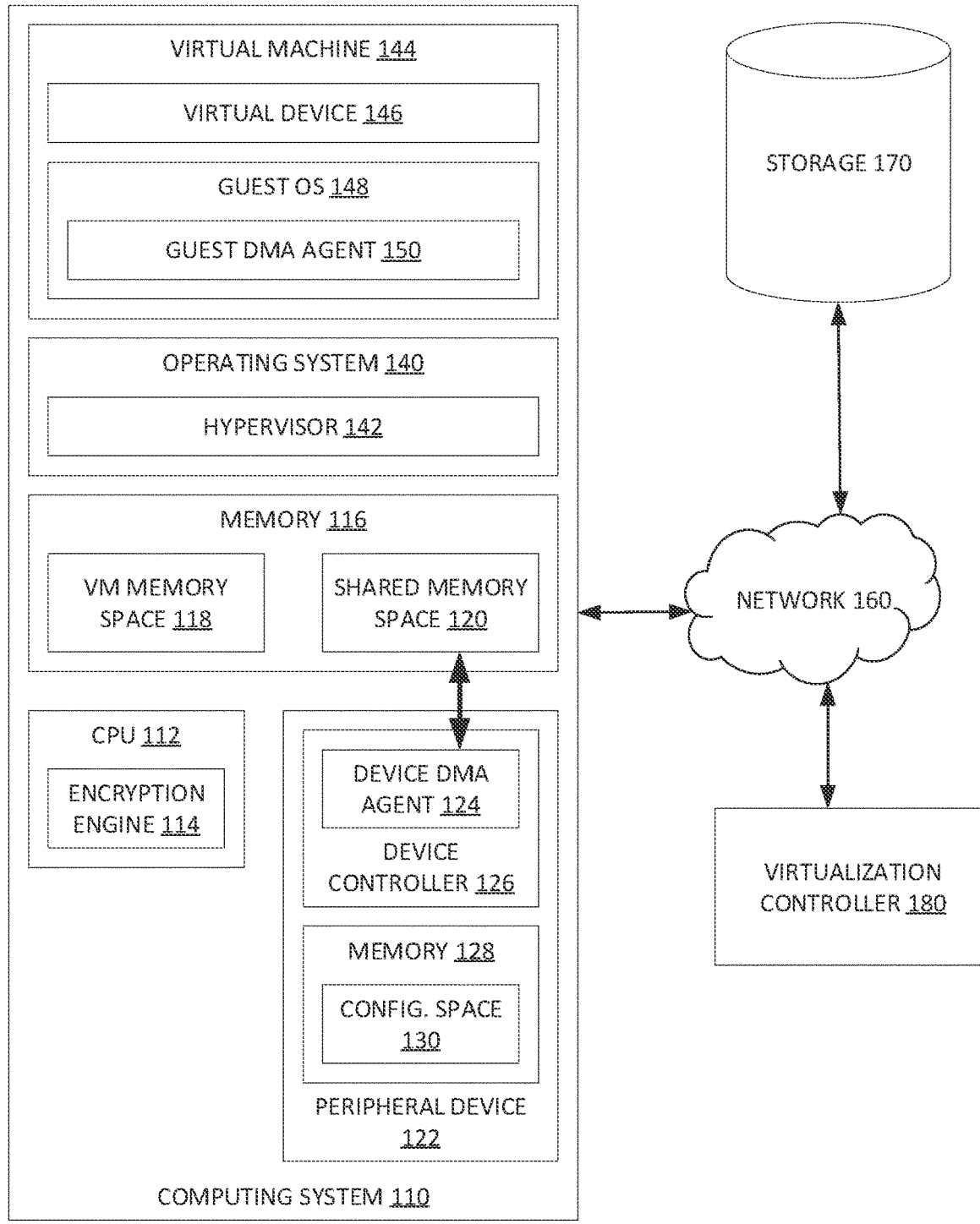
FIG. 1 illustrates a high-level component diagram of an example architecture for a virtualization system, in accordance with one or more aspects of the present disclosure.

Described herein are methods and systems for secure communication between a virtual machine (VM) and a peripheral device. In virtualized systems, a hypervisor may expose a virtual device to a VM running on a host computing system to permit the VM to execute instructions on a virtual device. A virtual device may be emulated from a peripheral device connected to the host computing system. A peripheral device herein refers to a device that is internally or externally connected to a computing system, such as the host computing system, and performs an input operation and/or an output operation upon receiving a request from the connected system. For example, a hypervisor may emulate a virtual networking device from a physical networking device connected to the host computing system to expose the physical networking device to the VM. The VM may send a packet on the network attached to the physical networking device by executing an instruction to send the packet via the virtual networking device. The VM may also receive data from the emulated peripheral device. In another example, the physical networking device may receive a packet via the network, and the networking device may send data included in the packet to the VM via the virtual networking device.

Direct memory access (DMA) is a hardware feature that enables a hardware subsystem (e.g., a network card, graphics card, etc.) to access the system memory without interacting with any central processing unit (CPU). In virtualized systems, a portion of physical memory of the host computing system may be reserved to facilitate DMA between the VM and a peripheral device exposed to the VM as a virtual device. For example, a DMA buffer may be reserved in the host memory. The VM and the peripheral device may execute instructions to program data stored in the DMA buffer (e.g., read data stored in the DMA buffer, write data stored in the DMA buffer, etc.).

Encrypted virtualization provides a security paradigm that protects VMs from physical threats, including other VMs and/or a hypervisor that manages the VMs. When encrypted virtualization is enabled, an encryption engine (e.g., firmware, circuitry of a processing device, etc.) of the host system may encrypt each memory page of a VM running on the host computer system with an encryption key that is unknown to other VMs and/or the hypervisor. Data received from or transmitted to a peripheral device exposed to an encrypted VM may be encrypted with the encryption key in order to prevent other VMs and/or the hypervisor from accessing the data.

Some conventional implementations utilize an un-encrypted portion of host memory to facilitate the transmission of private VM data between a VM and a peripheral device. Data transmitted from the peripheral device to the VM may be initially stored in the un-encrypted portion of host memory. The data may be encrypted, with the encryption key, by an encryption engine of a processing device of the host computing system and copied to the portion of memory reserved to facilitate DMA between the VM and the physical device (e.g., a DMA buffer). Similarly, encrypted data transmitted from the VM to the peripheral device may be initially stored at the DMA buffer. The data may then be copied to the un-encrypted portion of host memory and un-encrypted, with the encryption key, by the encryption engine before being accessed by the peripheral device.

The above described conventional implementation results in a significant increase in overall system latency as data is copied between the un-encrypted portion of the host memory and the DMA buffer during each instance of data transmission between the encrypted VM and the peripheral device. In some instances, copying between the un-encrypted portion of the host memory and the DMA buffer can increase overall system latency by as much as 15%. Further, as the VM is unable to distinguish between a real peripheral device and an emulated virtual device, a malicious hypervisor may access private VM data by emulating a trusted peripheral device and accessing data transmitted from the VM to the trusted peripheral device through the un-encrypted portion of host memory.

Implementations of the disclosure address the above-mentioned and other deficiencies by providing methods and systems for secure communication between a VM and a peripheral device. A peripheral device connected to a computing system exposes a public cryptographic key associated with the peripheral device to a VM running on the computing system. Responsive to receiving the public cryptographic key (e.g., verifying an electronic signature of the public cryptographic key), the VM may generate a cryptographic nonce value (e.g., by a random number generation) and encrypt the generated cryptographic nonce value with the public cryptographic key. The VM may transmit a message including the encrypted nonce value to the peripheral device. The VM may generate a shared cryptographic key from the encrypted nonce value by applying a pre-determined transformation (such as a cryptographic hash function) to the encrypted nonce value. Responsive to generating the shared cryptographic key, the VM may use the shared cryptographic key to access contents of a portion of shared memory space (e.g., a DMA buffer) utilized by the peripheral device.

Responsive to receiving the message including the encrypted nonce value, the peripheral device may decrypt the message using a private encryption key corresponding to the public cryptographic key, thus restoring the cryptographic nonce value. The peripheral device may apply the pre-determined transformation (which is shared between the VM and the peripheral device) to the cryptographic nonce value to generate the shared cryptographic key.

Responsive to generating the shared cryptographic key, the peripheral device may use the shared cryptographic key to access contents of the portion of shared memory space utilized by the VM.

In some implementations, the cryptographic nonce itself may be utilized as the shared cryptographic key by the VM and the peripheral device, thus eliminating the need to apply an additional transformation to the cryptographic nonce in order to produce the shared cryptographic key.

Accordingly, aspects of the present disclosure dramatically improve overall system latency by eliminating copying operations performed during each transmission of data between the VM and a peripheral device. Further, aspects of the present disclosure prevent a malicious hypervisor and/or other VMs from accessing private VM data. The peripheral device exposes a public cryptographic key specific to the peripheral device to the VM, which is verified by the VM prior to the encryption of the cryptographic nonce value and subsequent initiation of data transmission between the peripheral device and the VM. A VM cannot validate a public cryptographic key received from a malicious hypervisor and/or other VMs, and therefore, private VM data will not be transmitted from the VM to the malicious hypervisor and/or other VMs.

FIG. 1 illustrates a virtualization system 100 in which embodiments of the present disclosure may operate. It should be noted that other architectures for virtualization system 100 are possible, and that the implementation of a virtualization system 100 utilizing embodiments of the disclosure are not necessarily limited to the specific architecture depicted by FIG. 1.

Virtualization system 100 may include a computing system 110, one or more storage devices 170 and a virtualization controller 180, which may all be communicably connected over a network 160. The virtualization system 100 may be a processing device (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to implement secure communication during virtualization, in accordance with the present disclosure.

The network 160 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, computing system 110 may belong to a cluster comprising additional computer systems not depicted in FIG. 1, while in some other implementations, computing system 110 may be an independent system that is capable of communicating via network 160.

Computing system 110 may include hardware components, such as a physical central processing unit (CPU) 112. One or more processors may be embodied as CPU 112, which may be and/or include a micro-processor, digital signal processor (DSP), or other processing component. CPU 112 may process various received data and may carry out the code or instructions or one or more computer programs, for example, to provide input/output operations specified by the instructions. Computing system 100 may further include memory 116 and one or more peripheral devices 122.

Memory 116 may include volatile memory devices (e.g., random access memory (RAM)), non-volatile memory devices (e.g., flash memory), storage devices (e.g., a magnetic hard disk, a Universal Serial Bus (USB) solid state drive, a Redundant Array of Independent Disks (RAID) system, a network attached storage (NAS) array, etc.), and/or other types of memory devices. It should be noted that even though a single CPU 112 is depicted in FIG. 1 for computing system 100, this is merely illustrative, and that in some other examples, computing system 100 may include a two or more CPUs. Similarly, in some other examples, computing system 100 may include two or more memory components, rather than a single memory component.

Computing system 110 may host one or more VMs (VMs), such as VM 144. Computing system 110 may execute an operating system 140 (e.g., a host OS) to manage its resources. Each VM may execute a guest OS 148. Computing system 110 may execute hypervisor 142 to virtualize access to underlying host hardware, making the use of VMs running on computing system 110 transparent to the guest OS 148 running on the VMs and users (e.g., a system administrator) of computing system 110.

Peripheral device 122 may include any device that is internally or externally connected to another device, such as computing system 110, and performs an input operation and/or an output operation upon receiving a request from the connected device. Examples of a peripheral device include, but are not limited to, for an input operation, a mouse, keyboard, graphics tablet, image scanner, barcode reader, game controller, light pen, light gun, microphone, digital camera, webcam, dance pad, and read-only memory; for an output operation, a printer, computer monitor, projector, headphones, computer speaker; and for an input and output operation, a disk drive, USB flash drive, memory card and tape drive. In some embodiments, peripheral device 122 may be a storage device or a networking device. For example, peripheral device 122 may be a secure storage device (e.g., an encrypted storage device) or a secure networking device (e.g., an Internet Protocol Security (IPsec) enabled networking device). The secure storage device and/or the secure networking device may normally encrypt data received at the device. For example, a secure storage device may encrypt data received by the secure storage device to be stored at the secure storage device. In another example, an IPsec enabled networking device may encrypt data packets received at the networking device using the IPsec protocol prior to transmitting the data packets to another component.

Peripheral device 122 may include a device controller 126 and a local device memory 128. Device controller may include a device direct memory access (DMA) agent 124 to execute DMA operations, in accordance with embodiments described below. Local device memory 128 may include volatile memory devices, non-volatile memory devices, storage devices, and/or other types of memory devices. Local device memory 128 may include configuration space 130. Configuration space 130 may be mapped to memory 116. Configuration space 130 may be a portion of local device memory 128 allocated to facilitate configuration of peripheral device 122 with computing system 110. For example, configuration space 130 may store a public cryptographic key and/or a private cryptographic key associated with peripheral device 122. The public and/or private cryptographic key may be used by device controller 126 to facilitate secure communication with computing system 110. In some embodiments, configuration space 130 may include a shared portion of memory and a private portion of memory. The shared portion of memory may be a portion of configuration space 130 that is accessible to VM 144. The private portion of memory may be a portion of configuration space 130 that is encrypted using an encryption key. In some embodiments, VM 144 may access the private portion of configuration space 130 using a shared cryptographic key, in accordance with embodiments described herein.

CPU 112 may include an encryption engine 114 that provides an encrypted virtualization mechanism to encrypt VM 144 to protect VM 144 from physical threats, as well as from other VMs and hypervisor 142. In one embodiment, encryption engine 114 may be implemented as hardware circuitry of CPU 112. In some implementations, encryption engine 114 may be provided as firmware installed on computing system 110. The encryption engine 114 may implement a Secure Encrypted Virtualization (SEV) feature set provided by AMD®. A VM protected by the encrypted virtualization mechanism is also referred to herein as an "encrypted VM." In some embodiments, CPU 112 can be configured to encrypt VM 114 and/or data associated with VM 114 using a cryptographic key generated from a nonce value.

Memory 116 may include a VM memory space 118 and a shared memory space 120. VM memory space 118 may include memory that accessible to VM 144, as well as hypervisor 142, one or more other VMs, and/or other devices that are granted access to VM memory space 118. For example, a portion of VM memory space 118 may be private to VM 144 and another portion of VM memory space 118 may be shared with hypervisor 142 and/or other VMs. The private portion of VM memory space 118 may be encrypted with a cryptographic key by encryption engine 114 and is accessible to the VM 144 but inaccessible to hypervisor 142 or other VMs running on computing system 110. The shared portion of VM memory space 118 may be accessible to hypervisor 142, other VMs running on computing system 110, and/or other devices that are granted access to the shared portion of VM memory space 118. In some embodiments, the shared portion of VM memory space 118 may be encrypted with an encryption key that is accessible to hypervisor 142 and/or other VMs devices that are granted access to VM shared memory. Hypervisor 142 can use the shared portion of VM memory space 118 to communicate with VM 144 and/or one or more other VMs or devices that have access to VM shared memory. For example, to transmit data to VM 144, hypervisor 142 can store the data in shared memory. VM 144 may then retrieve the data from the shared potion of VM memory space 118.

Shared memory space 120 may be a portion of memory 116 configured to store a shared buffer (e.g., a shared page cache, a shared disk cache). In some embodiments, the shared buffer may be a direct memory access (DMA) buffer. The shared buffer may be configured to facilitate DMA operations executed by guest DMA agent 150 of guest OS 148 and/or device DMA agent 124 of device controller 126. Guest DMA agent 150 and/or device DMA agent 124 may be software or firmware configured to facilitate DMA between VM 144 and peripheral device 122 via shared memory space 120. DMA operations may enable guest OS 148 to access and modify memory 116 without interacting with hypervisor 142. DMA operations may further enable device controller 126 to access and modify memory 116 without interacting with CPU 112. DMA operations may be contrasted to memory access operations, which may use multiple calls across multiple virtualization layers to make a change to memory 116.

One or more portions of shared memory space 120 may be encrypted. For example, shared memory space 120 may include a DMA buffer storing data that is encrypted with a shared cryptographic key. Any component (e.g., VM 144, device controller 126) that has access to the shared cryptographic key can access contents of the encrypted portions of shared memory space 120 that are encrypted with the shared cryptographic key. The shared cryptographic key may be generated using a public cryptographic key associated with peripheral device 122, in accordance with embodiments described with respect to FIG. 2.

Figure 2:
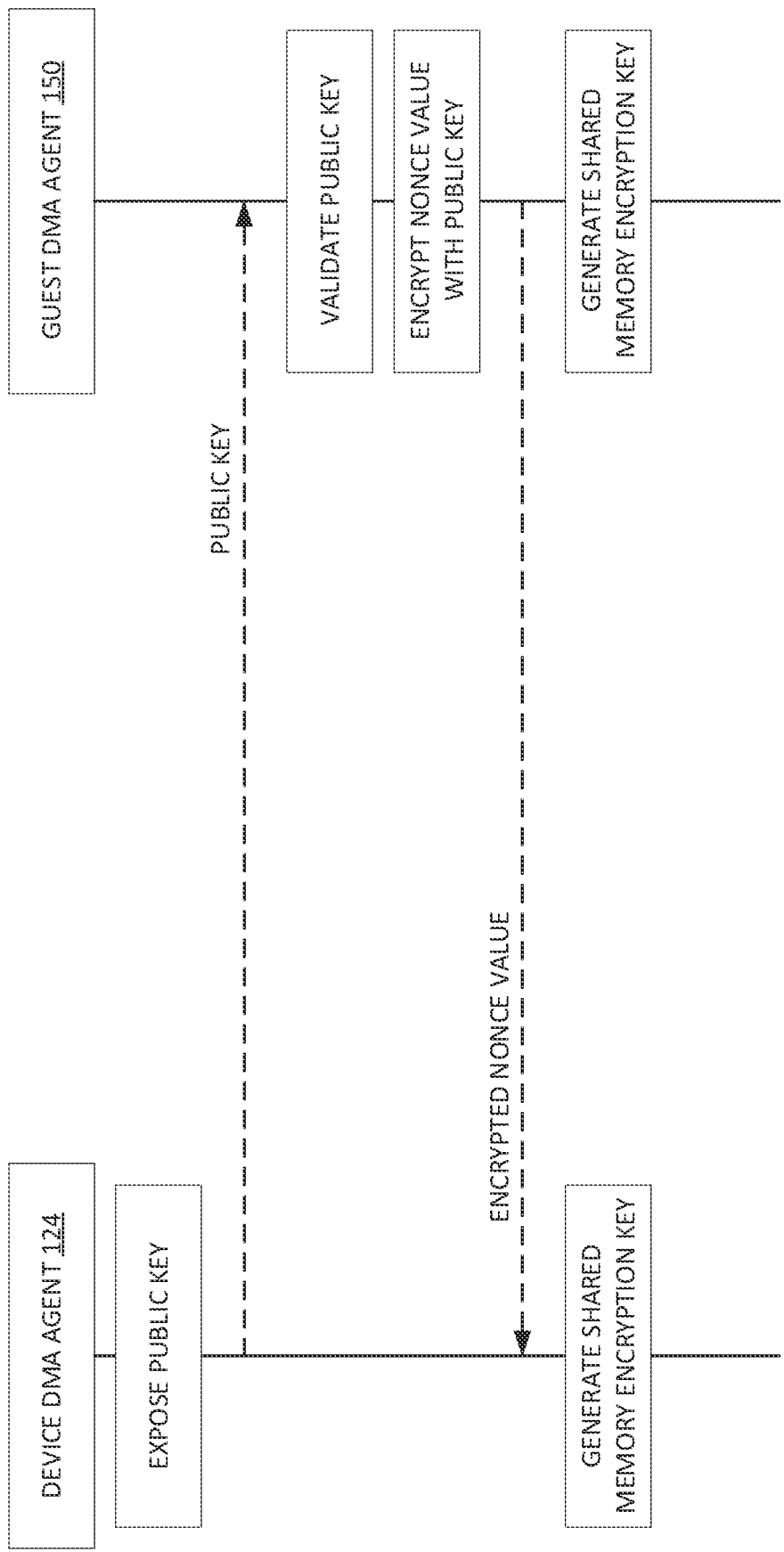
FIG. 2 illustrates an interaction diagram between a peripheral device and a virtual machine (VM) running on a computing system, in accordance with embodiments of the present disclosure.

FIG. 2 illustrates an interaction diagram 200 between a peripheral device and a VM operating on a computing system, in accordance with embodiments of the present disclosure. The peripheral device may be peripheral device 122 and the VM may be VM 144, described with respect to FIG. 1. In some embodiments, the interactions of interaction diagram 200 may be performed by device DMA agent 124 and guest DMA agent 150.

Device DMA agent 124 may expose a public cryptographic key associated with peripheral device 122 to VM 144. In some embodiments, device DMA agent 124 may expose the public cryptographic key by storing the public cryptographic key in configuration space 130 of local peripheral device memory 128. For example, device DMA agent 124 may store the public encryption key in the shared portion of configuration space 130. The public cryptographic key may include an electronic signature. In some embodiments, an electronic signature may include an identifier of a device that is trusted by guest DMA agent 150. In some embodiments, the electronic signature may be a signature of a manufacturer of peripheral device 122.

In some embodiments, guest DMA agent 150 may retrieve the public cryptographic key from configuration space 130 of local peripheral device memory 128. For example, guest DMA agent 150 may retrieve the public cryptographic key from the shared portion of configuration space 130. In other or similar embodiments, Guest DMA agent 150 may receive the public cryptographic key from device DMA agent 124 or hypervisor 142. For example, device DMA agent 124 may transmit the public cryptographic key directly to guest DMA agent 150. In another example, device DMA agent 124 may transmit the public cryptographic key to hypervisor 142. In another example, device DMA agent 124 may transmit the public cryptographic key to a CPU of a computing system, such as CPU 112. In such example, guest DMA agent 150 may retrieve the public cryptographic key from CPU 112. Responsive to receiving the public cryptographic key, hypervisor 142 may transmit the public cryptographic key to guest DMA agent 150.

Responsive to receiving the public cryptographic key, guest DMA agent 150 may validate the public cryptographic key. In some embodiments, guest DMA agent 150 may verify the electronic signature associated with the public cryptographic key. For example, guest DMA agent 150 may have access to a data structure including identifiers of one or more devices that are trusted by guest OS 148. A device may be determined to be trusted by guest OS 148 in response to a determination that the device satisfies one or more security and/or privacy conditions pertaining to the operation of VM 144 on computing system 110. Guest DMA agent 150 may compare the electronic signature associated with the public cryptographic key with each identifier included in the data structure. In response to determining that the electronic signature corresponds with an identifier included in the data structure, guest DMA agent 150 may determine that peripheral device 122 is a trusted device. Guest DMA agent 150 may validate the public cryptographic key using any other method for validating electronic signatures.

In some embodiments, responsive to validating the public cryptographic key, guest DMA agent 150 may generate a cryptographic nonce value. A cryptographic nonce value may be an arbitrary number that is used once in a single cryptographic communication between VM 144 and peripheral device 122. In other or similar embodiments, CPU 112 can generate the cryptographic nonce value and guest DMA agent 150 can retrieve the cryptographic nonce value from CPU 112. Guest DMA agent 150 may encrypt the cryptographic nonce value using the public cryptographic key. Guest DMA agent 150 may provide the cryptographic nonce value encrypted with the public cryptographic key to the peripheral device. In some embodiments, guest DMA agent 150 may transmit a message including the encrypted nonce value to device DMA agent 124. In other or similar embodiments, guest DMA agent 150 may transmit a message including the encrypted nonce value to hypervisor 142. Responsive to receiving the encrypted nonce value, hypervisor 142 may transmit the message to device DMA agent 124. In other or similar embodiments, guest DMA agent 150 may store the encrypted nonce value in the shared portion of configuration space 130 and guest DMA agent 124 may retrieve the encrypted nonce value from the shared portion of configuration space 130.

Device DMA agent 124 may produce the cryptographic nonce value by decrypting the message including the encrypted nonce value with a private cryptographic key associated with peripheral device. Responsive to decrypting the encrypted nonce value, device DMA agent 124 may generate the shared cryptographic key from the cryptographic nonce value.

The shared cryptographic key may be generated using any method for generating a cryptographic key. In some embodiments, guest DMA agent 150 may apply a pre-determined transformation to the encrypted nonce value to generate the shared cryptographic key. The pre-determined transformation may be known by guest DMA agent 150 and device DMA agent 124 prior to guest DMA agent 150 exposing the public encryption key to guest DMA agent 150. The pre-determined transformation, which maps its argument (e.g., the cryptographic nonce) to an output value (e.g., the shared cryptographic key), may be represented, for example, by a mathematical function, such as a cryptographic hash function. Guest DMA agent 150 may also generate the shared cryptographic key from the encrypted nonce value. In some embodiments, guest DMA agent 150 may also apply the pre-determined transformation to the encrypted nonce value to generate the shared cryptographic key.

In some embodiments, the shared cryptographic key can be approximately identical to the nonce value. In other or similar embodiments, the shared cryptographic key can be a symmetric key that may be used to encrypt and decrypt encrypted data. In other or similar embodiments, the DMA agent 124 can generate a pair of shared cryptographic keys. In such embodiments, a first key of the pair of shared cryptographic keys can be used to encrypt data and a second key of the pair of shared cryptographic keys can be used to decrypt encrypted data.

Responsive to generating the shared cryptographic key, guest DMA agent 150 and device DMA agent 124 may both use the shared cryptographic key to access contents of the portion of shared memory 120 utilized by VM 144 and peripheral device 122, in accordance with embodiments described with respect to FIGS. 3 and 4 below. In some embodiments, guest DMA agent 150 may use the shared cryptographic key to access contents of the private portion of configuration space 130.

Figure 3:
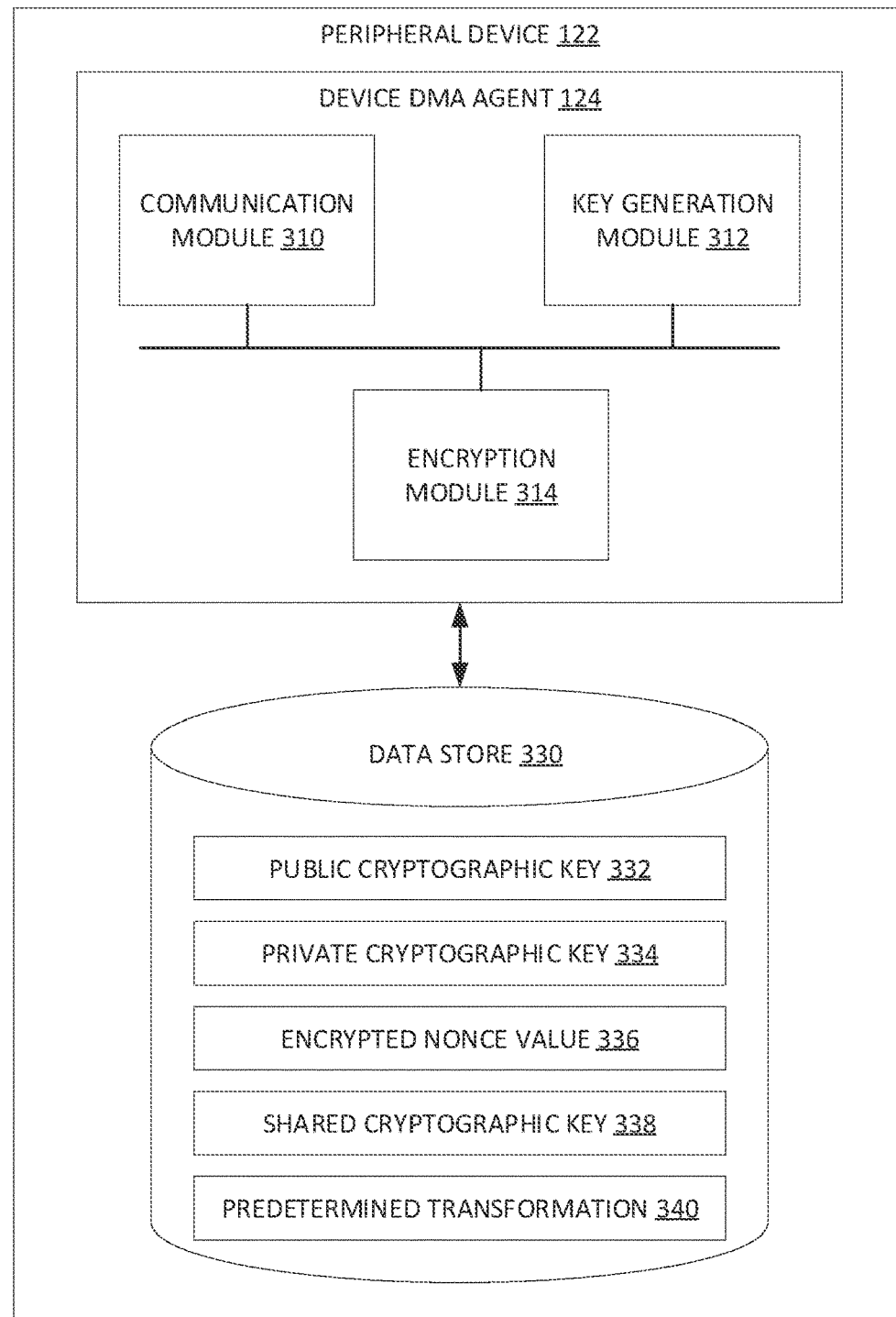
FIG. 3 depicts a block diagram illustrating an example of a peripheral device connected to a computing system, in accordance with embodiments of the present disclosure.

FIG. 3 depicts a block diagram illustrating an example 300 of a peripheral device connected to a computing system, in accordance with embodiments of the present disclosure. In some embodiments, the peripheral device may be peripheral device 122, described with respect to FIG. 1. Peripheral device 122 may include device DMA agent 124 and a data store 230.

As illustrated, device DMA agent 124 can include a communication module 310, a key generation module 312, and an encryption module 314. The communication module can communicate with data store 330 that stores a public cryptographic key 332, a private cryptographic key 334, a cryptographic nonce value 336, a shared cryptographic key 338, and a pre-determined transformation 340. In some embodiments, data store 330 can include one or more portions of memory 116. In other or similar embodiments, data store 330 can include one or more portions of configuration space 130.

Communication module 310 can further communicate with various components of computing system 110, such as hypervisor 142 and guest OS 148. For example, communication module 310 can expose public cryptographic key 332 to guest DMA agent 150 by transmitting public cryptographic key 332 to guest DMA agent 150, in accordance with previously exposed embodiments. In another example, communication module 310 can expose public cryptographic key 332 to guest DMA agent 150 by storing public cryptographic key 332 in a pre-determined portion of memory, such as the portion of configuration space 130 that is accessible to guest DMA agent 150 (i.e., the private portion of configuration space 130).

Communication module 310 may also receive messages transmitted to peripheral device 122. For example, communication module 310 may receive message from guest DMA agent 150 that includes an encrypted nonce value 336, in accordance with previously described embodiments. Encryption module 314 may decrypt the message received from guest DMA agent 150 using private cryptographic key 334 to produce the nonce value 336. In response to producing cryptographic nonce value 336, communication module 310 may store cryptographic nonce value 336 in data store 330.

Key generation module 312 may generate shared cryptographic key 338 using cryptographic nonce value 336 and pre-determined transformation 340. Key generation module 312 may apply pre-determined transformation 340 to cryptographic nonce value 336 to generate shared cryptographic key 338. In response to key generation module 312 generating shared cryptographic key 338, communication module 310 may store shared cryptographic key 338 in data store 330.

Device DMA agent 124 may use shared cryptographic key 338 to access encrypted data stored in shared memory space 120. In some embodiments, communication module 310 may receive a request, from an internal or external component or device, to read data associated with VM 144. Communication module 310 may determine wither the requested data is stored in shared memory space 120. Responsive to determining the data is stored in shared memory space 120, encryption module 314 may decrypt the contents of shared memory space 120 with shared cryptographic key 338. Responsive to determining the data is not stored in shared memory space 120, communication module 310 may transmit a request to guest DMA agent 150 to transmit the requested data to shared memory space 120 to be decrypted by encryption module 314.

Responsive to encryption module 314 decrypting the requested data, communication module 310 may transmit the data to the component or device that requested the data. In some embodiments, encryption module 314 may encrypt the decrypted data of shared memory space 120 with private cryptographic key 334 prior to transmitting the requested data to the requesting component or device.

In other or similar embodiments, communication module 310 may receive a request, from an internal or external component or a device, to provide data to VM 144. Responsive to communication module 310 receiving the request, encryption module 314 may encrypt the data to be stored to shared memory space 120 with shared cryptographic key 338. Communication module may copy the encrypted data to shared memory space 120 to be accessed by guest DMA agent 150.

Figure 4:
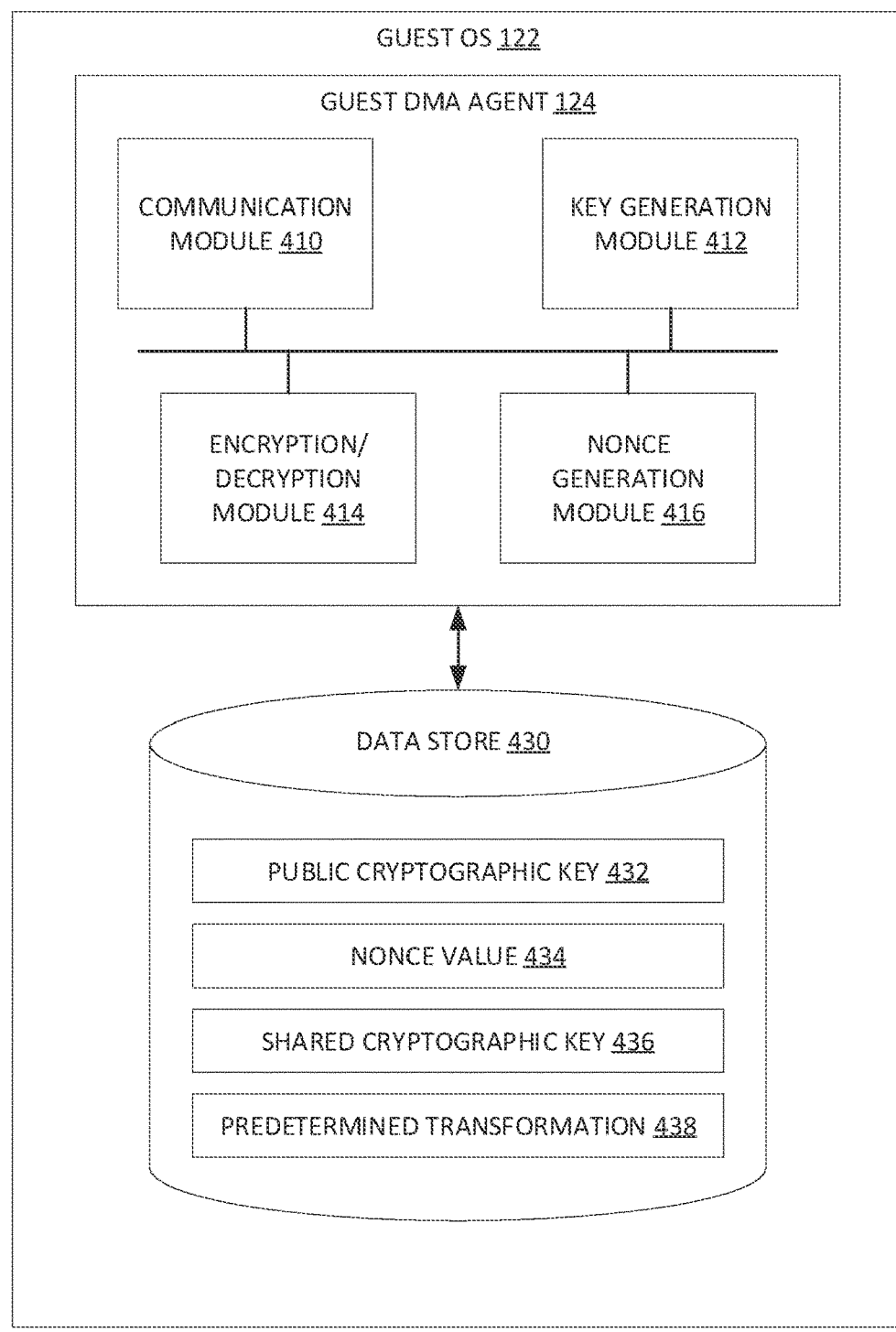
FIG. 4 depicts a block diagram illustrating an example of the guest operating system (OS) of a VM running on a computing system, in accordance with embodiments of the present disclosure.

FIG. 4 depicts a block diagram illustrating an example 400 of the guest operating system (OS) of a VM running on a computing system, in accordance with embodiments of the present disclosure. In some embodiments, the guest OS may be guest OS 148 of VM 144, described with respect to FIG. 1. Guest OS 148 may include guest DMA agent 150 and data store 430.

As illustrated, guest DMA agent 150 can include a communication module 410, a key validation module 412, a key generation module 414, an encryption module 416, and a nonce generation module 418. Communication module 410 can communicate with data store 430 what stores a public cryptographic key 432, a cryptographic nonce value 434, a shared cryptographic key 436, a pre-determined transformation 438, and a data structure including one or more trusted devices 440. In some embodiments, data store 430 can include one or more portions of memory 116. In other or similar embodiments, data store 430 can include one or more portions of VM memory space 118.

Communication module 410 can further communicate with various components of computing system 110, such as hypervisor 142 and peripheral device 122. For example, communication module 410 can receive public cryptographic key 332 from device DMA agent 124, in accordance with previously described embodiments. Responsive to receiving public cryptographic key 432, communication module 410 may store public cryptographic key 432 at data store 430.

Key validation module 412 may validate public cryptographic key 432. In some embodiments, key validation module 412 may verify an electronic signature associated with public cryptographic key 432. For example, key validation module 412 may compare the electronic signature with one or more identifiers of trusted devices included in trusted device data structure 440, in accordance with previously described embodiments.

Nonce generation module 418 may generate cryptographic nonce value 434 to be used to produce a shared cryptographic key 436, in accordance with previously described embodiments. In some embodiments, nonce generation module 418 may generate cryptographic nonce value 434 prior to communication module 410 receiving public cryptographic key 432. In other or similar embodiments, nonce generation module 418 may generate cryptographic nonce value 434 in response to key validation module 412 validating public cryptographic key 432.

Encryption module 416 may encrypt cryptographic nonce value 434 using public cryptographic key 432. Responsive to encryption module 416 encrypting cryptographic nonce value 434, communication module 410 may transmit a message including encrypted nonce value 434 (i.e., an encrypted message) to device DMA agent 124. In some embodiments, communication module 410 may store encrypted nonce value 434 in a pre-determined address of memory, such as the public portion of memory 130. Key generation module 414 may generate shared cryptographic key 436 using cryptographic nonce value 434 and pre-determined transformation 438, in accordance with previously described embodiments.

Guest DMA agent 150 may use shared cryptographic key 436 to access encrypted data stored in shared memory space 120. In some embodiments, communication module 310 may receive a request for data stored in a portion of shared memory space 120. For example, the request may be received from an application running on VM 144. Responsive to communication module 310 receiving the request, encryption module 416 may decrypt data stored in the portion of shared memory space 120 using shared cryptographic key 436. Communication module 310 may transmit the decrypted data to the application running on VM 144 that requested the data.

In some embodiments, communication module 410 may receive a request to provide data to peripheral device 122. For example, the request may be received from an application running on VM 144. Responsive to communication module 310 receiving the request, encryption module 416 may encrypt the data with shared cryptographic key 436. Communication module 410 may copy the encrypted data to a portion of shared memory space 120 (i.e., a DMA buffer).

Device DMA agent 124 may access the encrypted data via the portion of shared memory space 120, in accordance with previously described embodiments.

In some embodiments, guest DMA agent 124 may use shared cryptographic key 436 to access data stored in the private portion of configuration space 130. For example, guest DMA agent 124 may read data from, or write data to, the private portion of configuration space 130 using shared cryptographic key 436, in accordance with previously described embodiments.

Figure 5:
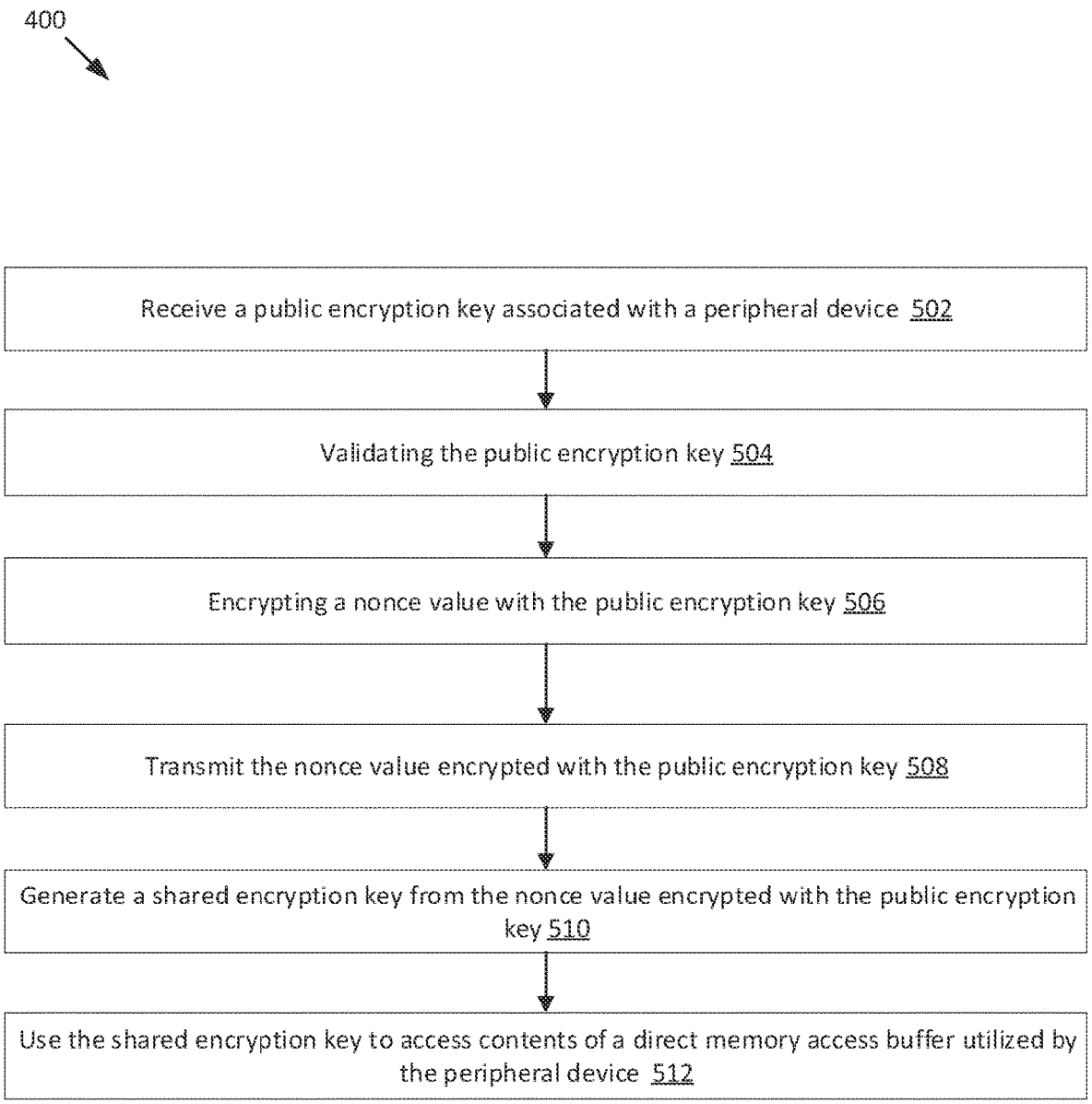
FIG. 5 is a flow diagram of a method for generating a shared cryptographic key, in accordance with embodiments of the present disclosure.
Figure 6:
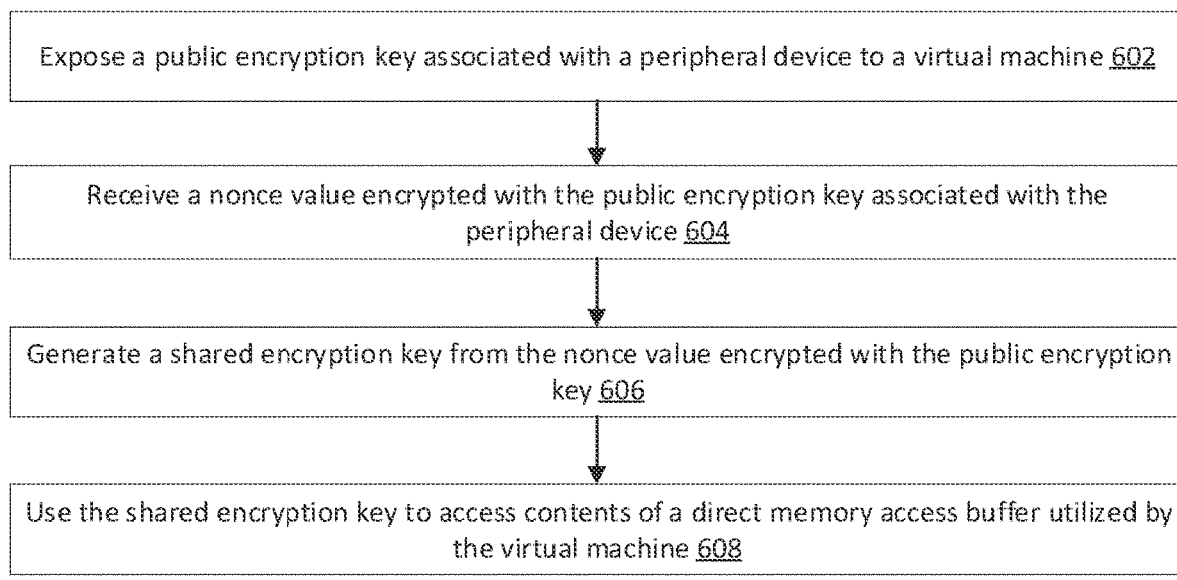
FIG. 6 is a flow diagram of another method for generating a shared cryptographic key, in accordance with embodiments of the present disclosure.

FIG. 5 is a flow diagram of a method 500 for generating a shared cryptographic key, in accordance with embodiments of the present disclosure. FIG. 6 is a flow diagram another method for generating a shared cryptographic key, in accordance with embodiments of the present disclosure. Method 500 may be performed by guest DMA agent 150 and method 600 may be performed by device DMA agent 124, as described with respect to FIG. 2. Methods 500 and 600 may be performed by processing logic that may comprise hardware (circuitry, dedicated logic, etc.), software (e.g., software executed by a general purpose computer system or a dedicated machine), or a combination of both. Methods 500 and 600 and each of their individual functions, routines, subroutines, or operations may be performed by one or more processors of the computer device executing the method. In certain implementations, methods 500 and 600 may each be performed by a single processing thread. Alternatively, methods 500 and 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In some embodiments, methods 500 and 600 may be performed by an executable code of a host machine (e.g., a host operating system or firmware), an executable code of a VM (e.g., a guest operating system or virtual firmware), or any other executable code, or a combination thereof.

Referring to FIG. 5, method 500 begins at block 502 where a VM operating on a computing system receives a public encryption key associated with a peripheral device. At block 504, the host DMA agent validates the public encryption key. At block 506, the VM encrypts a cryptographic nonce value with the public encryption key. At block 508, the VM transmits the cryptographic nonce value encrypted with the public encryption key. At block 510, the VM generates a shared cryptographic key from the cryptographic nonce value encrypted with the public encryption key. At block 512, the VM uses the shared cryptographic key to access contents of a direct memory access buffer utilized by the peripheral device.

As discussed above, FIG. 6 is a flow diagram of another method 600 for generating a shared cryptographic key, in accordance with implementations of the present disclosure. Method 600 begins at block 602 where a peripheral device of a computing system exposes a public encryption key associated with the peripheral device to a VM running on the computing system. At block 604, the peripheral device receives a cryptographic nonce value encrypted with the public encryption key associated with the peripheral device. At block 606, the peripheral device generates a shared cryptographic key from the cryptographic nonce value encrypted with the public encryption key. At block 608, the peripheral device uses the shared encryption key to access contents of a direct memory access buffer utilized by the VM.

Figure 7:
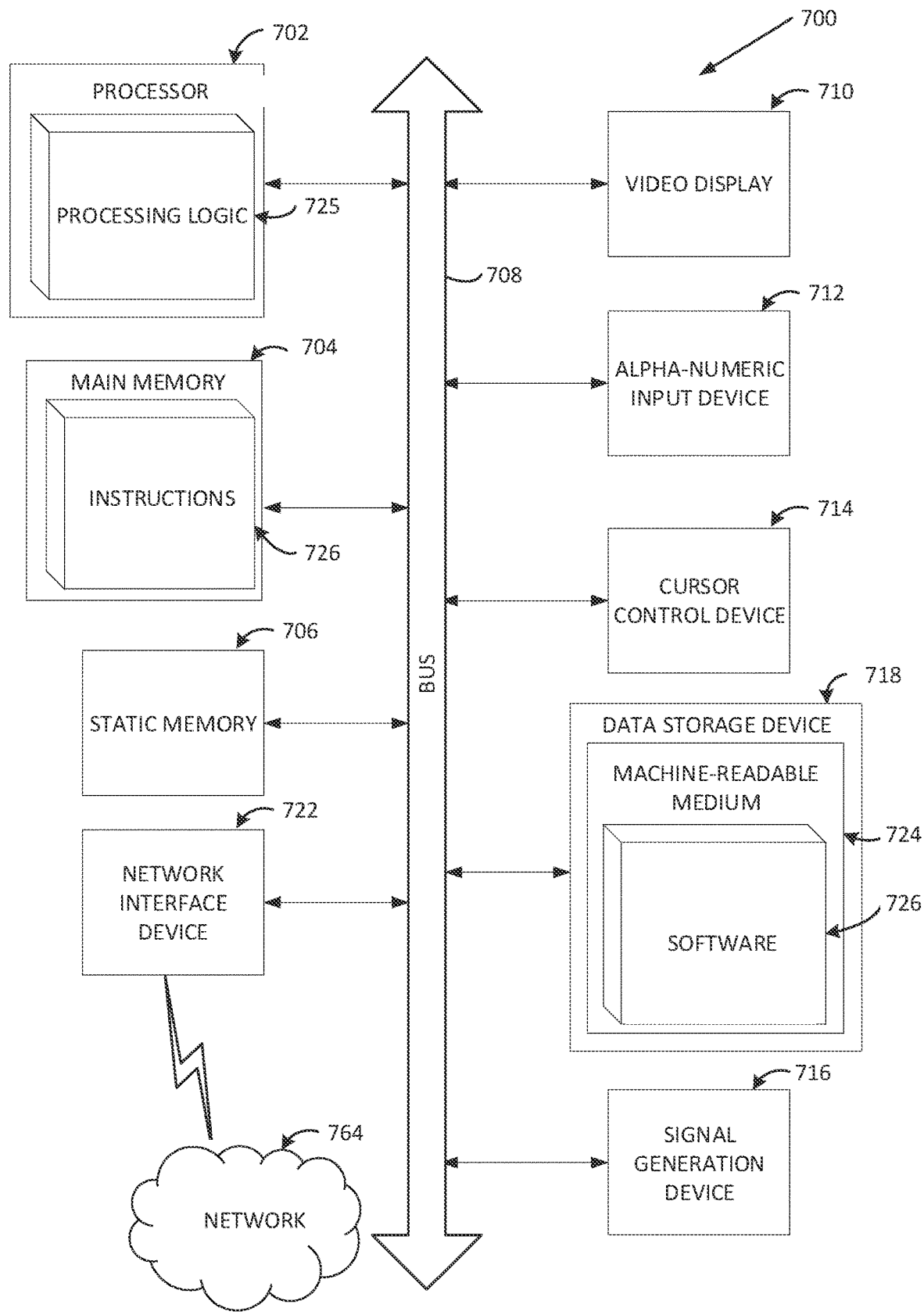
FIG. 7 is a block diagram illustrating a computing system in which implementations of the disclosure may be used.

FIG. 7 is a block diagram illustrating a computer system in which implementations of the disclosure may be used. In some implementations, the computer system 700 may support multicast live migration of encrypted VMs and/or transfer of encrypted VM snapshots, in accordance with previously described embodiments.

The computer system 700 may be included within a data center that supports virtualization. Virtualization within a data center results in a physical system being virtualized using VMs to consolidate the data center infrastructure and increase operational efficiencies. A VM may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is to execute the instructions 726 for performing the operations and steps discussed herein.

The computer system 700 may further include a network interface device 722 communicably coupled to a network 725. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Instructions 726 may reside, completely or partially, within volatile memory 704 and/or within processing device 702 during execution thereof by computer system 700, hence, volatile memory 704 and processing device 702 may also constitute machine-readable storage medium 724. The instructions 726 may also implement the guest DMA agent 150 and device DMA agent 124 to support secure communication between VM 144 and peripheral device 122.

Data storage device 716 may include a computer-readable storage medium 724 (e.g., a non-transitory computer-readable storage medium) on which may store instructions 726 encoding any one or more of the methods or functions described herein, including instructions for implementing method 500 of FIG. 5 and method 600 of FIG. 6.

The non-transitory machine-readable storage medium 724 may also be used to store instructions 726 to support caching results of certain commands utilized for building multi-platform application container images described herein, and/or a software library containing methods that call the above applications. While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500 and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
    exposing, by a peripheral device of a computing system, a public cryptographic key associated with the peripheral device of the computing system to a guest operating system running on the computing system, wherein the computing system comprises a memory further comprising a first memory space associated with the guest operating system;
    receiving, by the peripheral device, from the guest operating system, a message comprising a cryptographic nonce value encrypted with the public cryptographic key;
    producing, by the peripheral device, the cryptographic nonce value by decrypting the message using a private cryptographic key associated with the public cryptographic key;
    generating, by the peripheral device, a shared cryptographic key from the cryptographic nonce value produced by decrypting the message; and
    accessing, by the peripheral device, contents of a direct memory access (DMA) buffer associated with the peripheral device within a second memory space of the memory of the computing system using the shared cryptographic key.

2. The method of claim 1, wherein receiving the cryptographic nonce value encrypted with the public cryptographic key comprises:
    retrieving, by the peripheral device, the cryptographic nonce value from a pre-determined address of a memory of the peripheral device.

3. The method of claim 1, wherein the shared cryptographic key is used by the peripheral device and a processing device of the computing system to access the contents of the DMA buffer within the second memory space.

4. The method of claim 1, wherein exposing the public cryptographic key associated with the peripheral device of the computing system to the guest operating system running on the computing system comprises:
    storing, by the peripheral device, the public cryptographic key in a configuration space of the peripheral device.

5. The method of claim 1, wherein using the shared cryptographic key to access the contents of the DMA buffer comprises:

responsive to receiving a first request to read the contents of the DMA buffer within the second memory space, decrypting, by the peripheral device with the shared cryptographic key, the contents of the DMA buffer.

6. The method of claim 5, further comprising:
responsive to receiving a second request comprising data to be stored at the DMA buffer, encrypting the data with the shared cryptographic key; and
storing, by the peripheral device, the data encrypted with the shared cryptographic key in the DMA buffer within the second memory space.

7. The method of claim 1, wherein the peripheral device is at least one of an encrypted storage device or a networking device.

8. A peripheral device of a computing system, the peripheral device comprising:
a memory; and
a processing device operatively coupled to the memory, the processing device to:
expose a public cryptographic key associated with the peripheral device to a guest operating system running on the computing system, wherein the computing system comprises a system memory comprising a first memory space associated with the guest operating system;
receive, from the guest operating system, a message comprising a cryptographic nonce value encrypted with the public cryptographic key;
produce the cryptographic nonce value by decrypting the message using a private cryptographic key associated with the public cryptographic key;
generate a shared cryptographic key from the cryptographic nonce value produced by decrypting the message; and
use the shared cryptographic key to access contents of a direct memory access (DMA) buffer associated with the peripheral device within a second memory space of the system memory.

9. The peripheral device of claim 8, wherein to receive the cryptographic nonce value encrypted with the public cryptographic key, the processing device is to:
retrieve the cryptographic nonce value from a pre-determined address of the memory.

10. The peripheral device of claim 8, wherein the shared cryptographic key is used by the peripheral device and a processing device of the computing system to access the contents of the DMA buffer within the second memory space.

11. The peripheral device of claim 8, wherein to expose the public cryptographic key associated with the peripheral device to the guest operating system running on the computing system, the processing device is to:
store the public cryptographic key in a configuration space of the peripheral device.

12. The peripheral device of claim 8, wherein to use the shared cryptographic key to access the contents of the DMA buffer, the processing device is to:
responsive to receiving a first request to read the contents of the DMA buffer within the second memory space, decrypt, with the shared cryptographic key, the contents of the DMA buffer.

13. The peripheral device of claim 12, wherein the processing device is further to:
responsive to receiving a second request comprising data to be stored at the DMA buffer, encrypt the data with the shared cryptographic key; and
store the data encrypted with the shared cryptographic key in the DMA buffer within the second memory space.

14. A non-transitory computer readable storage medium including instructions that, when executed by a processing device of a peripheral device of a computing system, cause the processing device to perform one or more operations comprising:
exposing a public cryptographic key associated with the peripheral device of the computing system to a guest operating system running on the computing system, wherein the computing system comprises a memory further comprising a first memory space associated with the guest operating system;
receiving, from the guest operating system, a message comprising a cryptographic nonce value encrypted with the public cryptographic key;
producing the cryptographic nonce value by decrypting the message using a private cryptographic key associated with the public cryptographic key; and
generating a shared cryptographic key from the cryptographic nonce value produced by decrypting the message;
using the shared cryptographic key to access contents of a direct memory access (DMA) buffer associated with the peripheral device within a second memory space of the memory of the computing system.

15. The non-transitory computer readable storage medium of claim 14, wherein receiving the cryptographic nonce value encrypted with the public cryptographic key comprises:
retrieving the cryptographic nonce value from a pre-determined address of a memory of the peripheral device.

16. The non-transitory computer readable storage medium of claim 14, wherein the shared cryptographic key is used by the peripheral device and a processing device of the computing system to access the contents of the DMA buffer within the second memory space.

17. The non-transitory computer readable storage medium of claim 14, wherein exposing the public cryptographic key associated with the peripheral device of the computing system to the guest operating system running on the computing system comprises:
storing the public cryptographic key in a configuration space of the peripheral device.

18. The non-transitory computer readable storage medium of claim 14, wherein using the shared cryptographic key to access the contents of the DMA buffer comprises:
responsive to receiving a first request to read the contents of the DMA buffer within the second memory space, decrypting, with the shared cryptographic key, the contents of the DMA buffer.

19. The non-transitory computer readable storage medium of claim 14, wherein the one or more operations further comprise:
responsive to receiving a second request comprising data to be stored at the DMA buffer, encrypting the data with the shared cryptographic key; and
storing the data encrypted with the shared cryptographic key in the DMA buffer within the second memory space.

20. The non-transitory computer readable storage medium of claim 14, wherein the peripheral device is at least one of an encrypted storage device or a networking device.

* * * * *